United States Patent [19]

Date et al.

[11] 4,229,091
[45] Oct. 21, 1980

[54] MOTOR DRIVE DEVICE FOR A CAMERA

[75] Inventors: Nobuaki Date, Kawasaki; Susumu Kozuki, Yokohama; Tomonori Iwashita, Fuchu, all of Japan

[73] Assignee: Canon Kabushiki Kaisha, Tokyo, Japan

[21] Appl. No.: 21,180

[22] Filed: Mar. 16, 1979

Related U.S. Application Data

[63] Continuation of Ser. No. 827,000, Aug. 23, 1977, abandoned.

[30] Foreign Application Priority Data

Sep. 6, 1976 [JP] Japan ................ 51/106463
Sep. 6, 1976 [JP] Japan ................ 51/106464

[51] Int. Cl.³ .............................. G03B 1/18
[52] U.S. Cl. ................... 354/173; 354/213; 354/214
[58] Field of Search ............... 354/171–173, 354/204–206, 213, 214; 352/121, 124, 137, 169, 173, 175–177; 242/71.4–71.6

[56] References Cited

U.S. PATENT DOCUMENTS

| Re. 29,505 | 12/1977 | Aizawa et al. | 354/173 X |
|---|---|---|---|
| 3,688,669 | 9/1972 | Ogiso et al. | 354/171 |
| 3,719,335 | 3/1973 | Kurasawa | 352/124 X |
| 3,783,762 | 1/1974 | Sugimori | 354/173 |
| 3,820,140 | 6/1974 | Umeda | 354/171 |
| 3,981,022 | 9/1976 | Iwashita et al. | 354/171 |
| 3,994,003 | 11/1976 | Iwashita et al. | 354/214 X |
| 3,999,197 | 12/1976 | Iwashita et al. | 354/173 |
| 4,042,942 | 8/1977 | Haraguchi | 354/171 |
| 4,054,889 | 10/1977 | Tsujimoto | 354/173 X |

FOREIGN PATENT DOCUMENTS 2438581 2/1975 Fed. Rep. of Germany ........... 354/173

Primary Examiner—Donald A. Griffin
Assistant Examiner—William B. Perkey
Attorney, Agent, or Firm—Toren, McGeady and Stanger

[57] ABSTRACT

A motor wind up device which is automatically stopped after completion of photography of a roll of film in a camera. A control circuit of the motor controlling the wind up operation is changed over from a stop state to a wind up state by means of a signal produced when the shutter has run. When the motor is once stopped when over-torque is detected at the termination of the film to carry out the release operation, no shutter operation signal is produced because the shutter has not yet been completely wound up so that the motor will not run. When the film is terminated at the beginning of wind up operation, the device prevents the production of a false shutter operation completion signal even if the shutter does not run.

3 Claims, 10 Drawing Figures

MOTOR DRIVE DEVICE FOR A CAMERA

This is a continuation of application Ser. No. 827,000, filed Aug. 23, 1977, now abandoned.

The present invention relates to a motor drive device for film wind up and shutter charge of a camera.

Heretofore, such a motor drive device has been known that when a wind up action for a film wind up for one frame and a shutter charge, etc. is completed and a wind up mechanism of a camera is stopped, a change in wind up torque is detected to stop the rotation of the motor by the signal corresponding thereto. Many of such devices are that a switch is provided which is closed when the running of a shutter is completed after a shutter release and a motor is started for next wind up by a running completion signal from said switch. However, if the running completion signal is in a closed state when photographing of loaded film is all completed in the course of a wind up action, the motor continues rotation and thus the film or the wind up device receives undue force.

Because of this reason, a motor drive device having a film counter being built therein to detect a completion of photographing of one roll of film loaded in a camera, which is separate from a wind up completion of every one frame of a film, and for stopping a motor has been known for example by U.S. Pat. No. 3,783,762, etc.

However, it is rather troublesome for a photographer to set a number of photographing frames into said counter every time, further when a photographer wants to cut a long film at any desired spot in a middle of photographing of the film, it is difficult to set an exact number of frames. Also, an extra space is required in order to have a film counter built in a motor drive device, which also brings its cost up.

The present invention is directed toward the provision of a motor drive device which can automatically stop a motor at a time of completion of photographing of one roll of film without having a film counter built in the same, thus eliminating said shortcomings.

In order to realize this purpose in accordance with the present invention, the control circuit of the motor is changed over from the stop side to the wind up side by means of a signal produced when the shutter has run, whereby when the motor is once stopped while the over-torque is detected at the termination of the film so as to carry out the release operation, no shutter operation completion signal is produced because the shutter has not yet been completely wound up, in such a manner that the motor is never started again.

However, when the film is terminated at the beginning of the winding up operation, it is possible that a false shutter operation completion signal should be produced even if the shutter does not run.

That is, the switch for detecting the termination of the shutter operation is changed over from the switch-off state into the switch-on state immediately before the termination of the shutter operation, so that when the over-torque is detected at the termination of the film at the beginning of the wind up operation, it is possible that the shutter operation completion signal switch should be on. In such a case, the motor starts to rotate again.

In order to eliminate such a shortcoming as mentioned above, in accordance with the present invention, a shutter operation completion signal in the form of a pulse is used.

Thus, the motor drive device is kept in the stopped state, because the shutter operation completion signal switch does not produce any pulse even if the switch is in the switched-on state after the release operation has been carried out at the termination of the film at the beginning of the winding up operation.

Now the present invention will be explained in detail referring to the drawings of examples.

FIGS. 1 to 4 to show a first example, wherein

FIG. 2 is a plan of the same, while

FIG. 5 and FIG. 6 are to show a second example, wherein

FIG. 5 is a plan of a motor drive device and

FIG. 6 is a bottom plan of the camera.

FIGS. 7 and 8 show a third example, wherein

FIG. 7 is a plan of a motor drive device and

FIG. 8 is a circuit diagram.

FIGS. 9 and 10 show a fourth example, wherein

FIG. 9 is a circuit diagram and

FIG. 10 is a partially sectioned front elevation to show a relationship of a camera and a motor drive device.

Figure 1:
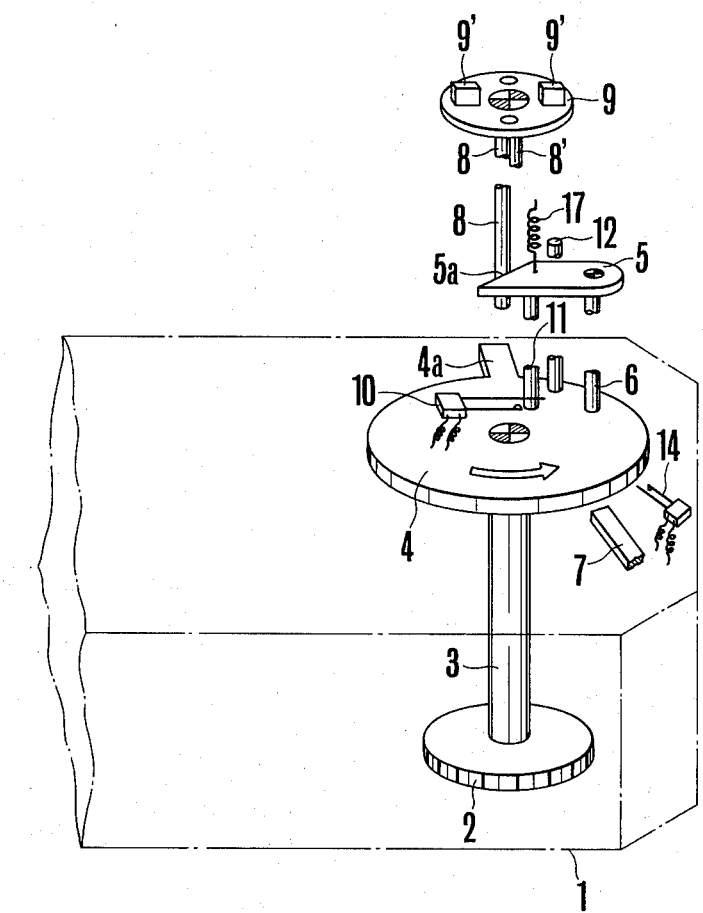
FIG. 1 is an oblique view to show a portion of a motor drive device.
Figure 2:
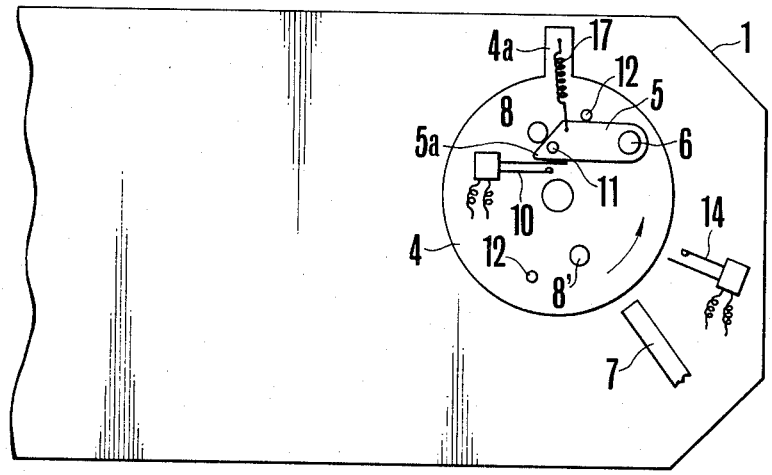

The first example is directed toward a device of the present invention as it is applied to a conventionally known camera in which the wind up gear is rotated only along one direction so as to wind up the film and change the shutter. What is shown as 1 in FIG. 1 and FIG. 2 is a casing of a motor drive device which can be attached to a camera by a mounting means, not shown in the drawing. A gear 2 associated with a motor M (not shown in the drawing) for wind up and a cam plate 4 connected to said gear 2 by an axle 3 are axially supported in rotatable manner within the casing 1. A connecting plate 9 for connection with a wind up mechanism within a camera is axially supported coaxially with said cam plate 4 in a rotatable manner at an upper part of the cam plate 4, and two pins 8, 8' are planted at under the plane of said connecting plate 9 while two projections 9' engaged with a coupling member of a camera are fixedly provided so as to protrude out of the casing 1 at the upper plane of the same.

A transmission lever 5 engaged with either one of said pins 8, 8' is axially supported in a rotatable manner around an axle 6 at an upper plane of the cam plate 4, and is biased in clockwise direction by a spring 17 but is normally stopped as it is engaged with a pin 12 fixedly provided at the cam plate 4. What is shown as 10 is an excessive torque signal switch provided on the cam plate 4 and is pressed by a pin 11 on said transmission lever 5, then is closed when said lever 5 is rotated to counterclockwise direction around the axle 6, generating an excessive torque signal. What is shown as 7 is a release lever associated with a shutter release mechanism, not shown in the drawing, within the camera, releasing a shutter as it is shifted by being pressed by a projection 4a of the cam plate 4, and closing a release signal switch 14.

Figure 3:
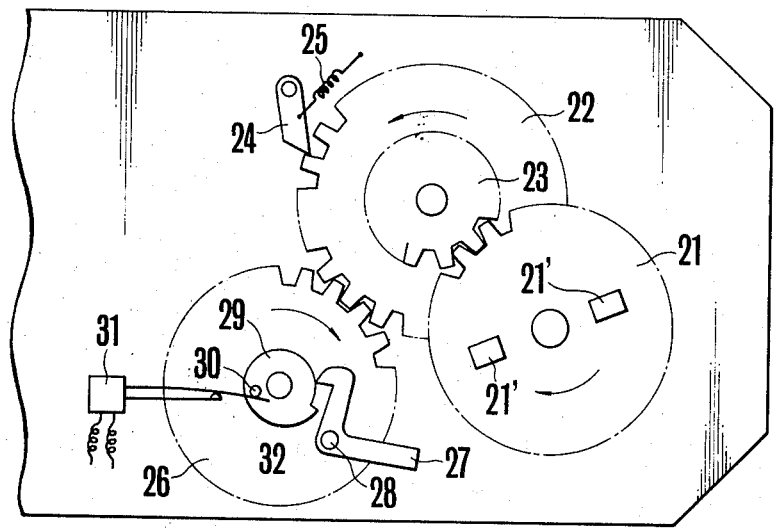
FIG. 3 is a plan to show a bottom plane of a camera.

FIG. 3 shows a bottom plane of a camera, wherein what is shown as 21 is a wind up gear having two projections 21' engaged with said projections 9' and 22, 23 are intermediate gears connected to each other, while 24 is a reverse rotation prevention claw, having its forward end rotatingly biased by a spring 25 to a direction engaging with the teeth of the gear 22. What is shown as 26 is a shutter charging gear, being axially supported so as to be able to rotate co-axially with a shutter shaft 32. A checking lever 27 engaged with a shutter disc 29 fixedly provided at a lower end of said axle is axially supported over the gear 26 by an axle 28 in a rotatable manner. What is shown as 31 is a shutter running signal switch being pushed by a pin 30 on the disc 29 and being closed thereby, generating a shutter running signal.

Figure 4:
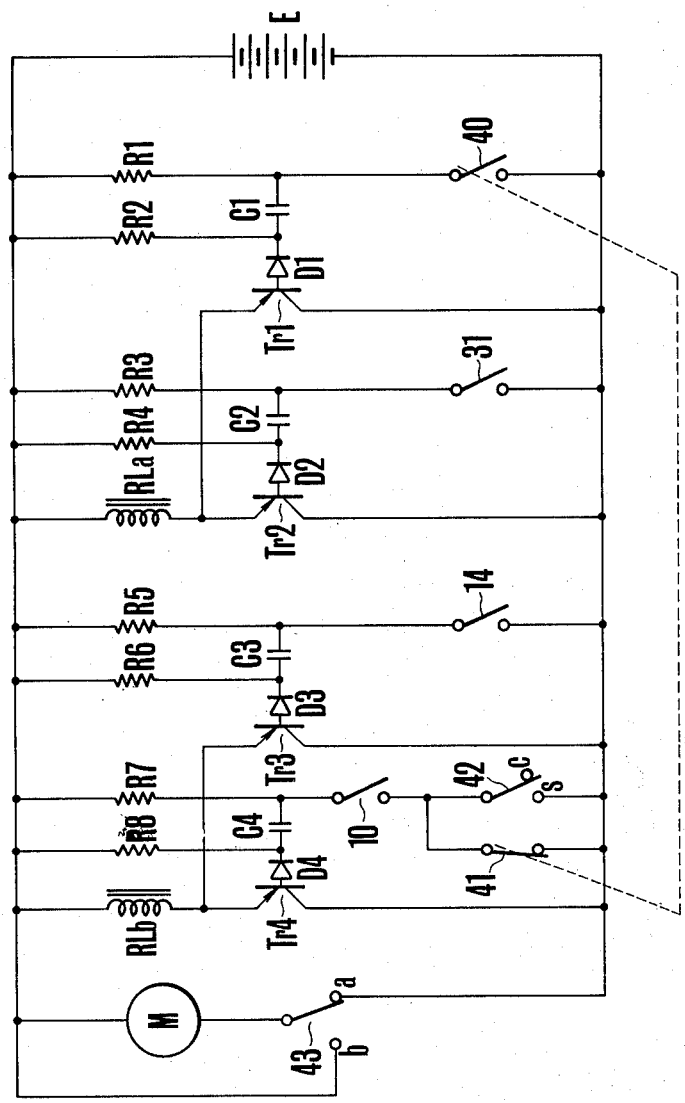
FIG. 4 is a circuit diagram.
Figure 10:
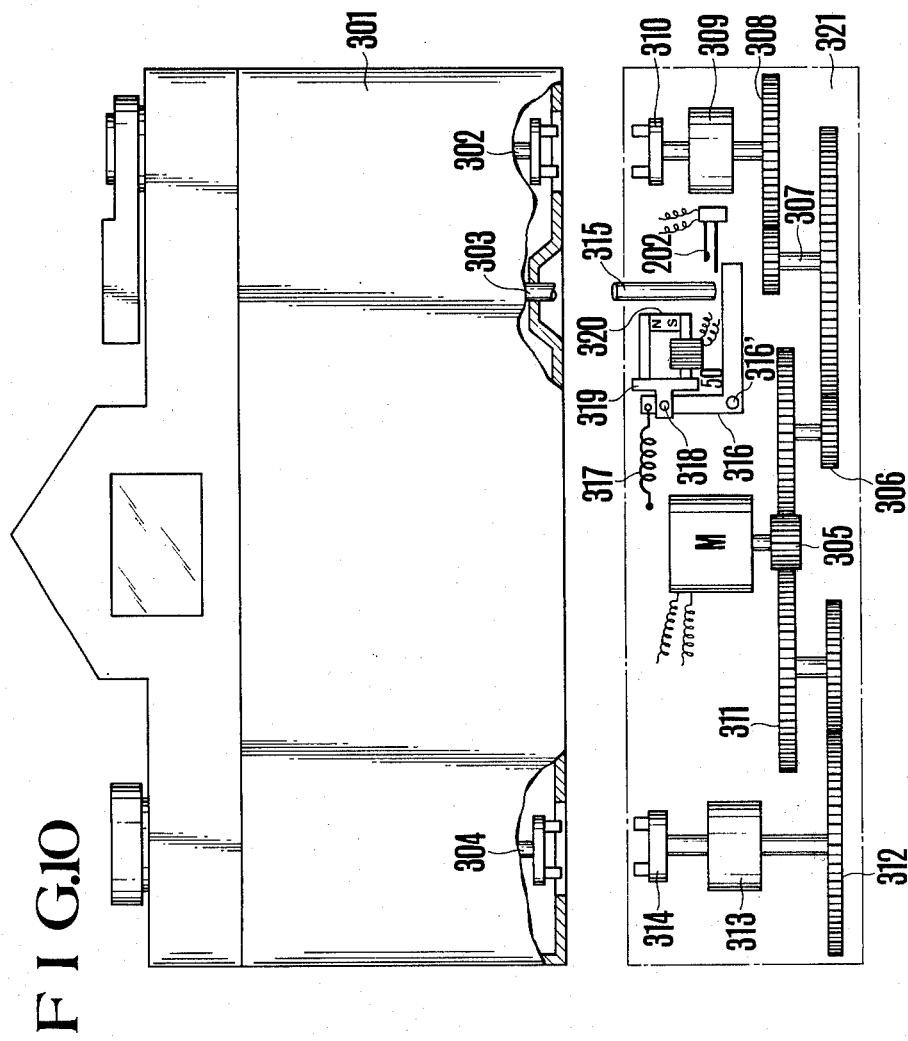

Next, explanation will be made concerning a circuit shown in FIG. 4. What is shown as E is a power source, R1, R2, R3, R4, R5, R6, R7, R8 are resistances, C1, C2, C3, C4 are capacitors, D1, D2, D3, D4 are reverse current prevention diodes, Tr1, Tr2, Tr3, Tr4 are transistors and M is a motor. What is shown as 14 is a release signal switch shown in FIG. 2, and 10 is an excessive torque switch, while 31 is a shutter running switch, and 40, 41 are start button switches of an electric driving device, wherein the switch 40 becomes ON as the button is pressed down, while the switch 41 becomes ON when a finger is removed from the button.

Next, explanations will be made concerning a function in the case of ordinary photographing. When a start button is pressed down to make the switch 40 ON, a pulse created by differentiation by the capacitor C1 and the resistance R2 places the transistor Tr1 in ON state and power is supplied to a latching relay RLa. Then a change over switch 43 is connected to a terminal "a" and a motor starts running. When the cam plate 4 being associated therewith through the gear 2 is rotated in a direction of an arrow and the transmission lever 5 pushes the transmission pin 8 to rotate the same to counterclockwise direction, the wind up gear 21 and the intermediate gears 22, 23 shown in FIG. 3 rotate in the directions of arrows respectively, and the shutter charge gear 26 engaging therewith also starts rotation to the direction of arrow. When the checking lever 27 rotates together with the gear 26 and its forward end engages with a notched part of the disc 29, the disc 29 also rotates in the same direction, thus the shutter is charged. When the gear 26 rotates 360°, the shutter charge is completed and a film is wound up by one frame by a take up means not shown in the drawing, and a wind up mechanism of the camera is stopped. At this time, while the connecting plate 9 connected with the gear 21 is also stopped, as the motor still continues rotation, the cam plate 4 also continues rotation and a slanted part 5a at a forward end of the transmission lever 5 on said cam plate 4 runs over a pin 8. Thus the lever 5 rotates in counterclockwise direction around the axle 6 resisting a spring 17, then the pin 11 on said plate 4 closes the excessive torque switch 10.

When a single frame-continuous change over switch 42 is changed over to "c" terminal at a continuous side, even if the excessive torque switch 10 becomes ON after completion of wind up, as long as a start button is kept in a pressed state and the switch 41 is kept in the OFF state the transistor Tr4 does not work, therefore, the motor continues rotation, and as the projection 4a of the cam plate 4 actuates the release lever 7, the release signal switch 14 is pressed by said lever 7 and is closed to send current to the transistor Tr3 through the capacitor C3 and the resistance R6. Then the latching relay RLb is actuated and the change over switch 43 is connected to the terminal "b" side. Thus, the motor is short-circuited and is stopped.

When the checking lever is rotated in a clockwise direction around the axle 28 by a release mechanism associated with the shifting of the release lever 7, the shutter disc 29 is released and is rotated in a direction contrary to the arrow in FIG. 3 and thus the shutter runs. The pin 30 on the disc 29 presses a contacting piece of the switch 31 at an ending point of shutter running to place said switch in ON state, and power is sent to the relay RLa, and the motor is started again. The same procedures will be repeated, when the pressing of the start button is discontinued, the switch 41 becomes ON. Therefore, as the excessive torque switch 10 at the time of wind up completion becomes ON, the motor is stopped.

When the one frame photographing continuous photographing change over switch 42 is changed over to the one frame photographing terminal "s" and the start button is pushed, the switch 40 is closed and, in the same way as mentioned above, Tr1 is brought into the switched-on state by means of the pulse differentiated with C1 and R2 so as to supply current to the latching relay. Then, the change over switch 43 is connected to the terminal "a" and the motor starts to rotate. Because, as mentioned above, the motor wind up device stands still in the state in which the wind up operation has been completed, when the motor starts to rotate, the cam plate 4 rotates in such a manner that, at first, the projection 4a pushes the release lever 7 so as to release the shutter. When, along with the movement of the release lever 7, the release signal switch 14 is closed, the transistor Tr3 becomes conductive through the latching relay RL6 in such a manner that the change over switch 43 is connected to the "b" terminal so that the motor stops while the cam plate 4 assumes the state shown in FIG. 2.

When, in the same way as mentioned above, the shutter is released by means of the release lever 7 and the shutter operation completion signal switch 31 is closed by means of the pin 30 on the disc 29 at the end of the shutter operation, the transistor Tr2 is brought into the conductive state by means of the pulse differentiated with C2 and R4 so as to supply the latching relay RLa. Then, the change over switch 43 is changed over to the "a" terminal and the motor starts to rotate again. In the same way as in the case of the continuous photographing, the rotation of the motor is transferred to the connecting plate 9 through the lever 5 and 8 on the cam plate so as to drive the wind up mechanism. At the termination of the wind up operation, the wind up mechanism and the connecting plate 9 stop, while the cam plate 4 still continues to rotate so that the lever 5 rotates around the axis 6 beyond the pin 8 in such a manner that the over-torque switch 10 is closed when the lever 5 has passed by the pin 11. In this case, the switch 42 is connected to the "s" side so that when the over-torque signal switch 10 is closed, the transistor Tr4 is brought into the conductive state by means of the pulse differentiated with C4 and R8 and the change over switch 43 is changed over to the "b" side by means of the latching relay RLb so as to stop the motor. After the release of the start button, the motor stands still until the next operation of the button.

Below, the case in which the film is terminated during the wind up will be explained.

In the case of the continuous photographing mode, when the start button is pushed, the switch 40 is closed, the motor starts to run and the cam plates rotate in such a manner that the projection 4a pushes the release lever 7 so as to release the shutter. When the lever 7 operates the switch 14, the release signal is produced as mentioned above, whereby the switch 43 is changed over to the "b" side so as to stop the motor.

When, in operative engagement with the lever 7, the shutter is released and at the termination of the shutter operation the operation signal switch 31 is closed, the transistor Tr2 is brought into the conductive state by means of the pulse differentiated with the condenser C2 and the resistance R4 so as to actuate the relay RLa and change over the change over switch 43 to the "a" side in such a manner that the motor starts to rotate, the cam plate 4 rotates and the next wind up operation is started.

When, during this wind up operation the film is terminated, the wind up mechanism stops so that the connecting plate 9 as well as the pin also stops. However, the cam plate 4 continues to rotate so that the over-torque switch 10 is closed in the same way as in the case of the termination of the wind up operation. Thus, the switch 41 is opened while the switch 42 is connected to the "c" side, so that the relay RLb does not operate and the motor does not stop.

When the cam plate 4 continues to rotate and the projection 4a pushes the lever 7 so as to close the release signal switch, the stop signal is produced so as to change over the switch 43 and stop the motor.

Because, in this case the shutter has not been charged completely, even if the projection 4a works upon the lever 7, the shutter does not operate and, therefore, no shutter operation completion signal is produced with the switch 30 so that the motor never starts to rotate.

Because, in the case of the one frame photographing, the switch 42 has been connected to the "s" side, when the film is terminated during the wind up operation and the over-torque 10 is closed, an over-torque signal is produced with C4 and R8 so as to actuate the relay RLb, change over the switch 43 to the "b" side and immediately stop the motor.

Now, suppose that an excessive torque is detected while the switch 31 at the time of shutter running in the FIG. 3 happens to be in ON state as mentioned above when one roll of film is used up.

At a time of continuous photographing, release is performed consecutively after the excessive torque switch 10 is activated, and the release signal switch 14 becomes ON and the motor is stopped. However, since the switch 31 has been kept in the ON state even before the release signal switch 14 becomes ON, pulses will not be supplied through the capacitor C2. Thus an electric wind up mechanism can maintain a stopped state.

The procedure is similar in the case of single frame photographing, and while the motor is once stopped by an action of the excessive torque switch 10 and is restarted by pressing of a start button, it is retained in a stopped state after the switch 14 becomes ON after a release and the motor is stopped since the shutter running signal is not supplied.

Explanation has been made above concerning an example of a camera in which the wind up gear is rotated only along one direction so as to wind up the film and charge the shutter. Next, explanation will be made concerning a camera in which the winding up gear for charging the shutter and winding up the film rotates to and fro.

Figure 5:
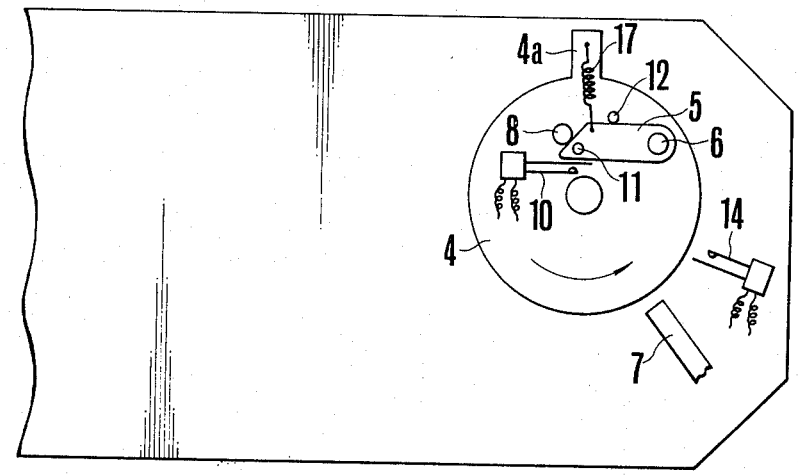
Figure 6:
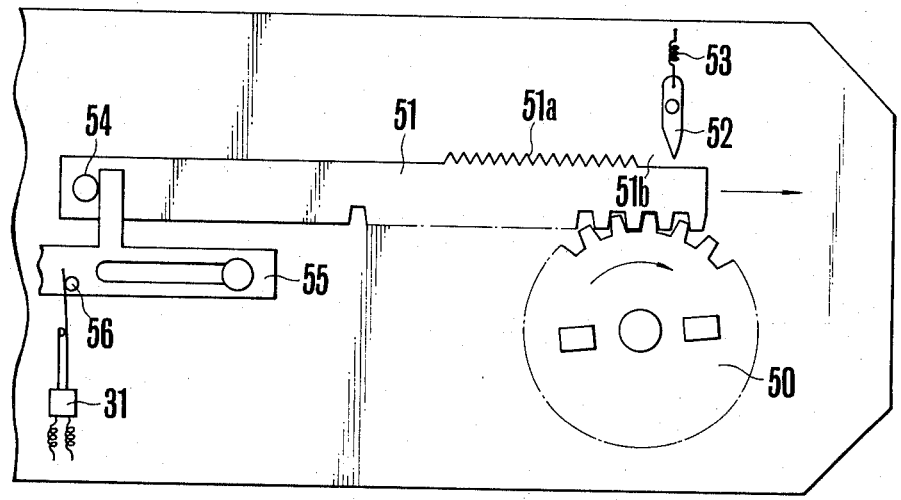

While an electric driving device the same as that in FIG. 2 except that only one transmission pin 8 is provided as shown in FIG. 5, a bottom part of a camera is different as shown in FIG. 6, wherein what is shown as 50 is a wind up gear, 51 is a rack gear, 52 is a reversing prevention claw for the rack, 51a is a ratchet part, 51b is a no teeth part of the ratchet, 53 is a spring, and 54 is a rack pin on the rack gear. What is shown as 55 is a shutter running plate which is connected with a shutter mechanism not shown in the drawing, and is checked in a state wherein it is moved to the right at a time when shutter charge is completed; it is moved to the left assuming the state shown in the drawing when the shutter runs. What is shown as 56 is a shutter running signal pin planted on the shutter running plate 55 to place the shutter running signal switch 31 in an ON state after the shutter runs.

In the case of the continuous photographing mode, the c-s change over switch 42 in FIG. 42 is connected to the "c" terminal as mentioned above. When, in the case of the state shown in FIG. 5 the start button is pushed, the switch 40 is closed and the motor starts to run in the same way as in the case of the first embodiment. When, thus, the cam plate 4 rotates, the connecting plate 9 also rotates through the lever 5 and the pin 8. Because the projection 9' on the connecting plate 9 (same as that shown in FIG. 1) is engaged with the projection of the wind up gear 50 so as to rotate the wind up gear 50, the rack 51 moves along the direction of the arrow, whereby the pin 54 on the rack 51 is engaged with the shutter driving plate 55 so as to move the plate 55 along the same direction and charge the shutter. The reverse prevention claw 52, whose end is pushed with the ratchet 51a, rotates around the shaft along the counterclockwise direction so as to allow the passage of the ratchet 51a.

When the cam plate 4 has rotated by a certain determined angle and the shutter driving plate 55 has moved up to a certain determined position, the wind up operation is completed while the shutter is charged. At this time, the shutter driving plate is held by means of a holding means, not shown in the drawing, while the shutter operation signal switch 31 is in the switched-off state. When the wind up operation has been completed, the gear 50 stops and, therefore, the connecting plate 9 as well as the pin 8 also stop, while the motor continues to rotate. Accordingly, in the same way as in the case of the above-mentioned embodiment, the lever 5 rotates around the shaft 6 against the strength of the spring 17 along the counterclockwise direction so as to pass over the pin 8 and close the over-torque signal switch. However, at this time, the switches 41 and 42 are opened, and no stop signal is produced.

On the other hand, the reverse prevention claw 52, whose end leaves the ratchet 51a at the termination of the wind up operation, is brought back into the original state, being pulled by means of the spring 53. Thus, the lever 5 is disengaged from the pin 8, when the gear 50, the rack 5 and the connecting plate 9 are moved along the opposite direction to the arrow, being pulled by means of a spring, not shown in the drawing, without being prevented with the claw 52, into the position shown in FIGS. 5 and 6.

The cam plate 4 continues to rotate by means of the motor, the projection 4a pushes the release lever 7 so as to move the lever 7 and the shutter driving plate 55 is released by means of a mechanism operatively engaged with the lever 7, while the release signal switch 14 is closed by means of the lever 7 so as to produce a signal, by means of which signal the switch 43 is changed over to the stop side so as to stop the motor.

Along with the shutter operation, the shutter driving plate 55 runs to the left up to the end position in the drawing, at which the shutter operation signal switch 31 is closed by means of the signal pin 56 in such a manner that a pulse is produced with C2 and R4 so as to actuate the relay RLa and change over the change over switch 43 to the a side so that the motor starts to rotate again.

Along with the start of the motor, the cam plate 4 starts to rotate along the direction of the arrow until the plate 4 has rotated by the remaining angle, when the state shown in FIG. 5 is assumed so as to engage the lever 5 with the pin 8 and start the wind up operation. While the start button is being pushed, the wind up operation and the shutter release are carried out continuously, when the start button is left alone, the motor stops in the wound up state in the same way as in the case of the first embodiment. In the case where the film is terminated during the wind up operation, the cam plate 4 continues to rotate when the wind up mechanism has stopped in such a manner that in the same way as in the first embodiment, the motor stops by means of the release signal produced when the switch 14 is closed.

Because, in this case, the claw 52 is engaged with a ratchet tooth of the rack 51 so as to prevent the reverse movement of the rack 51, even if the projection 4a moves the release lever 7, the shutter operation signal switch 10 is not closed because the movement of the shutter driving plate 55 is prohibited by means of the pin 54, so that the motor does not start to rotate again.

When the film is terminated before the first tooth of the ratchet 51a of the rack 51 has been engaged with the claw 52 at the beginning of the wind up operation, the rack 51 and the shutter driving plate 55 immediately return to the position shown in FIG. 6, when the wind up mechanism stops and the lever 5 is disengaged from the pin 8 due to the continued rotation of the motor, so that at times the shutter operation switch is closed so as to produce a pulse. However, after the cam plate 4 has closed the signal switch 14 so as to stop the motor, no pulse is produced even if the switch 31 has been closed, so that the motor does not start to rotate again.

Because the switch 42 has been connected to the "s" side in the case of the normal operation in the one frame photographing mode, the stop signal is produced when the over-torque switch 10 is closed no matter when the wind up has been completed or the film has been terminated during the wind up, so that the switch 43 is also changed over to the "b" side so as to stop the motor immediately.

Even if a false shutter operation signal pulse is produced so as to rotate the motor after detecting the over-torque when the film has been terminated at the beginning of the wind up operation, no shutter operation signal pulse is produced after the motor has stopped due to the closing of the release signal switch 14, so that the motor is kept in the stopped state in the same way as in the case of the first embodiment.

The above completes the explanations of an electric driving device which makes wind up of a camera and release of a camera. Also, while said examples of the present invention mentioned above show a camera and an electric driving device in a separate and independent manner, the same effect can be obtained even in a device in which both a camera and an electric driving device are combined together.

Further, explanations will be made a case in which the present invention is applied to an electric wind up device (hereinafter called as a winder) which makes wind up only of a camera.

Figure 7:
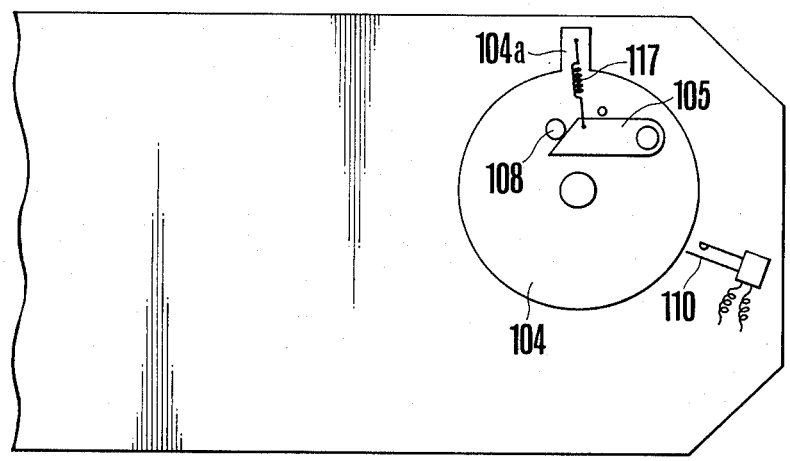
Figure 8:
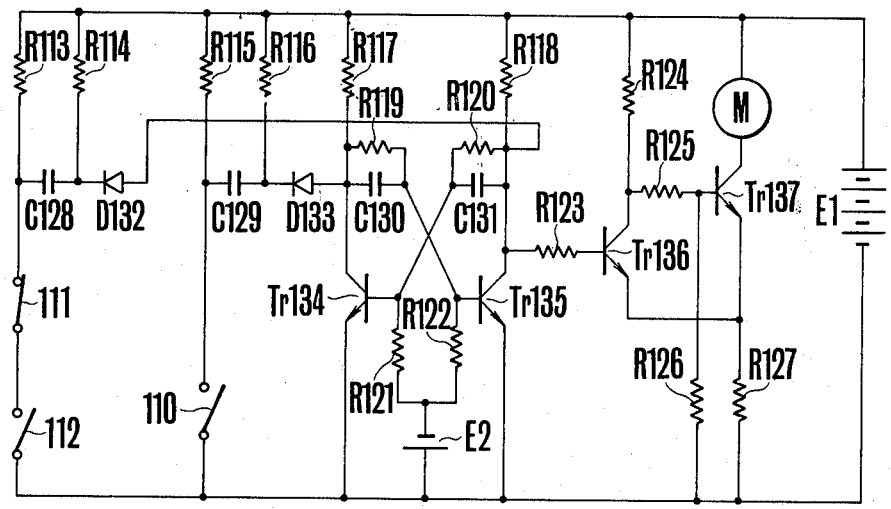

FIG. 7 and FIG. 8 are an upper plane diagram and its circuit diagram, respectively.

In FIG. 7, what is shown as 104 is a cam plate, 105 is an excessive torque detection lever, 117 is a spring, 108 is a transmission pin, and 110 is a switch which is provided at a position shown in the drawing so that it becomes ON by a projection 104a after the cam plate 104 rotates 180° or more required for wind up.

In FIG. 8, what is shown as 111 is a switch which becomes ON as a finger leaves off a release button of a camera, 112 is a switch which becomes ON after a shutter runs, R113, R114, R115, R116, R117, R118, R119, R120, R121, R122, R123, R124, R125, R126, R127 are resistances, C128, C129, C130, C131 are capacitors, D132, D133 are diodes, Tr134, Tr135, Tr136, Tr137 are transistors, E1, E2 are power sources, and M is a motor.

Now its function will be explained. When a release button of a camera is pressed after wind up is completed to make a release, the switch 112 becomes On after the shutter runs. But as the switch 111 is kept in an OFF state while the button is being pressed, the action of the winder is not started. When a finger is left off the button, the switch 111 becomes ON, and trigger pulses being differentiated by the capacitors C128 and the resistance 114 place the transistor Tr134 of a known type of multiple stable multivibrator circuit in OFF state, placing the transistor Tr135 in ON state. The transistor Tr136 of a known type of switching circuit is placed in OFF state through the resistance R123 for buffer, and the transistor Tr137 becomes ON, thus the motor starts rotation.

While the transmission pin 108 comes off the excessive torque lever 105 of FIG. 7 when said torque lever 105 rotates about 180° completing wind up, the motor is not stopped at once, instead it continues rotation, and when the switch 110 becomes ON, the negative pulse created by the capacitor C129, the resistance R116 of the circuit of FIG. 8 place the transistor Tr135 in an OFF state, and the transistor Tr137 of the switching circuit is made OFF. Thus, only then the motor is stopped.

Then, the above mentioned procedure can be repeated by pressing down a release button of a camera.

But when a roll of film is finished when a wind up is incomplete, in a camera allowing a single frame wind up, the pulses of shutter running signal are not supplied while in a camera not allowing a single frame wind up the cam plate 104 rotates and said pulses are inputted at a time before the excessive torque switch 110 is made ON, therefore the motor is not re-started after the switch 110 becomes ON.

Figure 9:
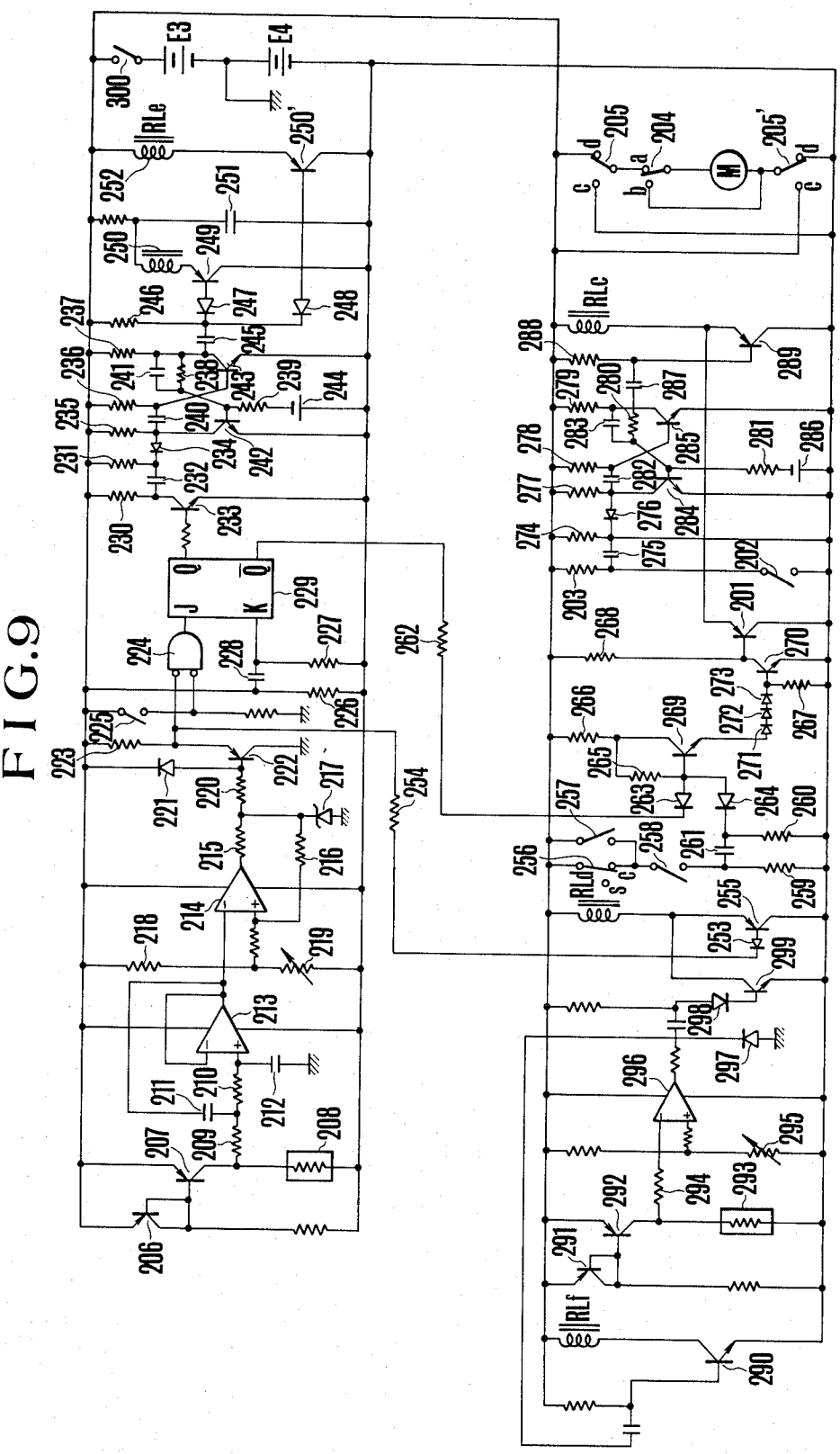

FIG. 9 and FIG. 10 show an example of such set up wherein, at the same time as the finishing of film is detected and a motor is stopped, a rewinding of a film is automatically performed in a motor drive device. In FIG. 9, what is shown as E3, E4 are power sources and grounding is made between the same. What is shown as M is a motor, and 204 is a first change over switch being connected to a terminal "a" or to a terminal "b" by latching relays RLc, RLd, wherein the motor M rotates in a state connected to the terminal "a", and the motor M is short-circuited, effecting a braking in a state as being connected to the terminal "b".

What are shown as 205, 205' are second change over switches to change over the rotating directions of a motor, being connected to a terminal "d" in the normal case but being connected to the terminal "c" side as the latching relay RLe is activated. The motor M rotates to a wind up direction when said switch is connected to the terminal "d", but is rotated to a rewinding direction when the same is connected to the terminal "c".

What are shown as 206, 207 are transistors to supply power to a strain gauge 208 which connects the base and the collector of the transistor 206 and is connected to the transistor 207. The strain gauge 208 is attached to a wind up means within the electric driving device in such manner that resistance value increases as wind up torque increases during a wind up of camera.

What are shown as 209, 210 are resistances, and 211, 212 are capacitors, while 213 is an operation amplifier, and these component parts constitute a low-pass filter.

What is shown as 214 is a comparator having positive feedback by a resistance 216, and having hysteresis characteristics. What is shown as 217 is a Zener diode to clamp the output level from the comparator 214, and 218, 219 are voltage dividing resistances to supply the set torque value into the comparator, while 219 is a variable resistance. What is shown as 215 is a resistance. Resistances 220, 223, a diode 221, a transistor 222 constitute an interface circuit between the comparator 214 and a NOR circuit 224. What is shown as 225 is a wind up completion switch within a camera and becomes ON at the time when wind up is completed.

What are shown as 226, 227 are resistances and 228 is a capacitor to supply positive pulses into a K terminal of a JK flip-flop 229 as a power source is put in and to place Q output at a low level (hereinafter referred to as "L") and $\bar{Q}$ output at a high level (hereinafter referred to as "H").

What are shown as 230, 231 are resistances, and 232 is a capacitor to transmit the negative pulses at a time when the Q terminal of the JK flip-flop has an H level and the transistor 233 becomes OFF. What is shown as 234 is a diode, and a known type of monostable multivibrator circuit is constructed with said diode 234, resistances 235, 236, 237, 238, 239, capacitors 240, 241, transistors 242, 243, and a power source 244.

What is shown as 245 is a capacitor and 246 is a resistance to transmit negative pulses at a time when the transistor 243 of said monostable multi-vibrator changes from OFF state to ON state to transistors 249, 250', respectively through diodes 247, 248.

What is shown as 250 is a coil to which large current is supplied by a capacitor 251 when the transistor 249 becomes ON, and when power is supplied to the coil 250, the electric driving device actuates a re-winding button (hereinafter referred to as FR button) of a camera. What is shown as 252 is a resistance to charge the capacitor 251.

What is shown as 253 is a diode, and 254 is a resistance, and when the electric driving device detects an excessive torque during a wind up the collector voltage of the transistor 222 is lowered and the transistor 255 becomes ON to supply power to the latching relay RLb.

What is shown as an 256 is a single-continuous change over switch (hereinafter referred to as S.C. change over switch) of the electric driving device and is connected to a terminal "s" at the time of single photographing and to a terminal "c" at the time of continuous photographing.

What is shown as 257 is a release button switch within a camera and is arranged to become OFF when the release button is pressed down and to become ON when the operator's finger is left off the button. A camera in this example has an electro-magnetic release device, not shown in the drawing built therein and a release of the camera is not performed by the electric driving device but is performed by a shutter release button of the camera.

What is shown as 258 is a shutter running signal switch which becomes ON when a shutter follower screen of a camera runs and is in the ON state partially during a wind up process of the camera by the electric driving device.

What are shown as 259, 260 are resistances and 261 is a capacitor to transmit the positive pulses by the above mentioned group of switches.

What is shown as 262 is a resistance connected to $\bar{Q}$ terminal of the JK flip-flop.

What are shown as 263, 264 are diodes, and 265, 266, 267, 268 are resistances, while 269, 270 are transistors, and 271, 272, 273 are level shift diodes, wherein the transistors 269, 270 become ON only when an input of H level is supplied to both of the diodes 263, 264, and the collector voltage of the transistor 270 is lowered.

When the collector voltage of the transistor 270 is lowered, the transistor 201 becomes ON and power is supplied to the latching relay RLc.

What is shown as 202 is a switch which becomes ON when an R button push up member shown in FIG. 10 is activated, wherein negative pulses are transmitted to a monostable multivibrator at a back stage through the resistances 203, 274, the capacitor 275, and the diode 276.

Resistances 77, 78, 79, 80, 81, capacitors 282, 283, transistors 284, 285 and a power source 286 constitute a known type of monostable multivibrator, wherein the pulses of the R button switch are delayed for a prescribed period of time and a transistor 289 is made ON through a capacitor 287 and a resistance 288.

When the transistor 289 becomes ON, power is supplied to the latching relay RLc. Also a constant current circuit by transistor 291, 292 is to supply current to a strain gauge 293 for torque detection at the time of re-winding and to activate a comparator 296. What is shown as 294 is a resistance, 295 is a variable resistance, while 297, 298 are diodes and 290, 299 are transistors.

Explanation has have been made on component parts shown in FIg. 1, the drawing shown in FIG. 10 is to illustrate a mechanism of an electric driving device according to the present invention.

What is shown as M is a motor to make a forward rotation, reverse rotation and stopping.

What is shown as 301 is a camera, 302 is a coupling member for wind up thereof, 303 is an R button, and 304 is a film re-winding member. What is shown as 321 is a motor drive device which can be detachably attached to a camera.

What is shown as 305 is a gear provided at the motor M, and 306, 307, 308 are intermediate gears to transmit winding up power, while 309 is a one way clutch, and 310 is a coupling member for wind up, wherein the action of the motor in the wind up direction is transmitted to the wind up coupling member 310, but the action in the re-winding direction is not transmitted.

What are shown as 311, 312 are intermediate gears to transmit re-winding force of the motor, and 313 is a one way clutch, while 314 is a re-winding member, wherein the action of the motor in the re-winding direction is transmitted to the re-winding member 314 through the one way clutch 313, but the action thereof to wind up direction is not transmitted.

What is shown as 315 is an R button pin to press the R button and is provided for sliding in an up and down direction in the drawing.

What is shown as 316 is a push up lever to press the R button pin 315 and is biased in a counterclockwise direction by a spring 317, while an armature 319 coupled with the push up lever 316 by an axle 318 is attracted to a permanent magnet 320.

Since the coil 250 in FIG. 9 is provided to generate magnetic flux in a direction offsetting the magnetic flux by the permanent magnet 320 when power is supplied thereto, the armature 319 leaves off the magnet 320 by the action of the spring 317 when power is supplied to the coil 250, and the push up lever 316 rotates in a counterclockwise direction to push up the R button pin 315 upward.

Next, explanation will be made on the function in FIG. 9 and FIG. 10.

In FIG. 9, when the power switch 300 is made ON, a positive pulse is supplied into the K terminal of the JK flip-flop 229 by the capacitor 228 and the resistance 227, and $\overline{Q}$ output becomes to an H level.

When the S.C. change over clutch 256 is connected to "c" terminal and a release button of a camera is pressed, a shutter is released and the switch 258 becomes ON as a follower screen runs, then positive pulses are provided through the capacitor 261 and the resistance 260. Since the voltage of H level is provided to the diode 263 from the JK flip-flop 229, the transistors 269, 270 become ON and power is supplied to the latching relay RLc through the transistor 201. Therefore the switch 204 is changed over the "a" side and the motor starts rotation. When a wind up is completed, the wind up completion switch 225 becomes ON and the resistance value of the strain gauge 208 which has detected excessive torque increases and the output level of the low-pass filter 213 increases and low level output is generated from the comparator 214.

Then the transistor 255 becomes ON and power is supplied to the latching relay RLd, then the switch 204 is changed over to the "b" terminal and the motor is stopped. Also while an excessive torque signal is supplied to the NOR gate 224, the NOR gate 224 will not be opened as a wind up completion signal is also supplied.

As has been explained above, since this camera has an electro-magnetic release device built therein and is released by the AND operation of a release button pressing signal and of a wind up completion signal, it is released simultaneously with wind up completion as long as pressing of the release button is maintained. In this operation, action is different from the first and second embodiments in that the shutter is released by means of the release button.

When the shutter running switch 258 is made ON after release, as long as the S.C. change over switch 256 is connected to "c" terminal, the same procedure will be repeated. When the S.C. change over switch 256 is connected to the terminal "s", the positive pulses are not generated even if the shutter running signal switch 258 becomes ON, but the positive pulses are generated only when the operator's finger is left off a release button to place the release button switch 257 in ON state, and the change over switch 204 is connected to "a" then wind up is started. Thus, since the release button is not depressed at a time of wind up completion and electromagnetic release is not performed, single frame photographing will be accomplished.

While the function at a time of ordinary photographing is as explained above, when a roll of film is finished and the strain gauge 208 detects excessive torque as wind up is incomplete, L level output is generated by the comparator 214 as has been mentioned above, and the motor is stopped and said output is supplied into one of the terminals of the NOR gate 224.

At this time, since the wind up completion switch 225 is turned OFF since wind up is incomplete, L level voltage is supplied also into the other terminal of the NOR gate 224, and said NOR gate 224 is opened, then the Q output of the JK flip-flop 229 becomes H level while $\overline{Q}$ output thereof becomes L level.

Since the $\overline{Q}$ output is connected to the diode 263, when the $\overline{Q}$ output is at the L level, the transistors 269, 270, and further the transistors 201 will not be turned ON, and the motor will not be started by a follower screen signal.

Also, since the Q output supplies the trigger pulses to a monostable multivibrator consisting of transistors 42, 43 at a rear stage, positive pulse a supplied through the capacitors 45 and the resistance 46 after lapse of a prescribed period of time, that is, after the action within a camera is completely stopped.

Since the transistor 249 becomes ON and power is supplied to the coil 250 when positive pulses are supplied, the push up lever 316 in FIG. 10 has its attraction by the magnet 320 released and is rotated in a counterclockwise direction around the axle 316' by a power of the spring 317 and the R button of a camera is pushed up through the R button pin 315 to secure state allowing a re-winding of film.

At the same time the transistor 250' becomes ON and power is supplied to the latching relay RLe and the change over switch 205 is changed over to "c" side to make preparation for rotation in a re-winding direction.

In FIG. 10, when the push up lever 316 is activated, the R button switch 202 becomes ON.

When the R button switch 202 becomes ON, negative pulses are transmitted by the capacitor 275 and the resistance 274 in FIG. 9 to a monostable multivibrator consisting of the transistors 284, 285 at a rear stage. After a lapse of prescribed period of time by said monostable multi-vibrator, negative pulses make the transistor 289 ON through the capacitor 287 and power is supplied to the latching relay RLc, thus rotation in a re-winding direction is started.

Since the re-winding torque decreases when a re-winding is completed and a film leaves from a sprocket and a spool, the reduction in torque detected by the strain gauge 293 places the output voltage of the comparator 296 at H level and places the transistor 299 in an ON state, supplying power to the latching relay RLd, thus the motor is stopped.

At the same time, the latching relay RLf is activated through the transistor 290 and the change over switch 205 is returned to its initial state, thus completing a series of action.

While two strain gauges are used in this example, one strain gauge can perform the required function.

What is claimed is:

1. A motor drive device of a camera designed so that the motor is automatically stopped at the termination of the film during the continuous photographing, comprising:
    a motor for driving a winding up mechanism of the camera for winding up the film and charging the shutter;

an over-torque detecting means, said means producing an over-torque signal when the wind up torque of the camera is larger than a certain determined value;

a wind up completion switch, said switch being changed over by the incompletion and completion of the winding up of the film and being closed in accordance with the wind up completion to produce the wind up completion signal;

a holding means, which includes a flip-flop and is reversed to generate a film finishing signal when an excessive torque signal is generated from an excessive torque detection switch while the winding up completion switch is deactuated; and a motor control circuit which stops the motor by the excessive torque signal generated by the excessive torque detection means and prevents starting of the motor by the film finishing completion signal input from the holding means, said film finishing signal being connected to at least the motor control circuit.

2. A motor drive device in accordance with claim 1, comprising:

a first delay means, said means starting to operate in accordance with the film termination signal produced by means of the holding means so as to produce the electromagnet driving signal at the end of the operation;

an electromagnet, said electromagnet operating the re-wind change over means by means of the driving signal produced with the first delay means; and a re-wind change over means, said means changing over the camera in the re-wind state by means of the electromagnet.

3. A motor drive device in accordance with claim 2, comprising:

a re-wind change over switch, said switch being operated by means of the re-wind change over means;

a second delay means, said means starting to operate by means of the re-wind change over switch, so as to produce the motor rotation signal at the termination of the operation; and a motor control circuit, said circuit rotating the motor by means of the rotation signal of the motor.

* * * * *